US007667877B2

(12) United States Patent
Morimoto

(10) Patent No.: US 7,667,877 B2
(45) Date of Patent: Feb. 23, 2010

(54) DOCUMENT READER

(75) Inventor: Yasumasa Morimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 825 days.

(21) Appl. No.: 11/367,146

(22) Filed: Mar. 3, 2006

(65) Prior Publication Data

US 2006/0203307 A1 Sep. 14, 2006

(30) Foreign Application Priority Data

Mar. 9, 2005 (JP) ............................ 2005-065712

(51) Int. Cl.
*H04N 1/04* (2006.01)
*G03G 15/00* (2006.01)

(52) U.S. Cl. ....................... 358/474; 358/496; 358/498; 358/481; 399/364; 399/374

(58) Field of Classification Search ................. 358/475, 358/509, 510, 513, 471, 473, 400, 497; 271/3.14, 271/8.1; 399/16, 17, 363, 366, 367
See application file for complete search history.

(56) References Cited

U.S. PATENT DOCUMENTS 5,298,937 A * 3/1994 Telle ........................... 355/23
6,785,488 B2 * 8/2004 Katsuyama .................. 399/84
7,064,874 B2 * 6/2006 Imai ........................... 358/498
2002/0039207 A1 * 4/2002 Kanda ........................ 358/498
2004/0179242 A1 * 9/2004 Nakaya ...................... 358/461

FOREIGN PATENT DOCUMENTS

| | | |
|---|---|---|
| JP | 05-037727 | 2/1993 |
| JP | 06-054142 | 2/1994 |
| JP | 2002-182437 | 6/2002 |
| JP | 2002-344695 | 11/2002 |
| JP | 2002-359725 | 12/2002 |
| JP | 2003-324579 | 11/2003 |

* cited by examiner

*Primary Examiner*—Jerome Grant, II
(74) *Attorney, Agent, or Firm*—Renner, Otto, Boisselle & Sklar, LLP

(57) ABSTRACT

A document reader includes a document feeder conveying a document along a document conveyance path, a first image reader reading an image formed on a first side of the conveyed document, and a second image reader reading an image formed on a second side of the conveyed document. Each of the first and second image readers is of an optical reduction system constituted of a light source, a mirror, a lens and an image sensor. The second image reading means is unified into a single assembly including at least the mirror, the lens and the image sensor, to be thus detachably attached, as a single unit, to the document feeding means. Thus, the document reader can clearly read the images formed on the first and second sides, it requires a short period of time from image reading to image outputting, and its maintenance is readily conducted.

7 Claims, 8 Drawing Sheets

100
1
2
3
4
5
6
7
8
9
10
11
12a
12b
12c
13
14
15
16
20
21
22a
22b
22c
22d
23
24
25
26
30
F

25
F
43
26
41
20
40a

DOCUMENT READER

CROSS-REFERENCE TO RELATED APPLICATIONS

This application is related to Japanese application No. 2005-065712 filed on Mar. 9, 2005, whose priority is claimed under 35 USC § 119, the disclosure of which is incorporated by reference in its entirety.

BACKGROUND OF THE INVENTION

1. Field of the Invention

The present invention relates to a document reader and, more particularly, to a document reader capable of reading images formed on both sides of a document while the document is automatically conveyed.

2. Description of the Related Art

In the conventional art relevant to the present invention, there has been known a document reader for reading images formed on both sides of a document while the document is automatically conveyed, the document reader comprising a document conveyance path, image reading means of an optical reduction system for reading an image formed on a first side of the document, and an image sensor of a contact type for reading an image formed on a second side of the document, wherein the document conveyance path includes, on a part thereof, a flat back-up guide plate urged by urging means, so that the image formed on the first side of the document is read by the image reading means of an optical reduction system and, then, the image formed on the second side of the document is read while the back-up guide plate urges the second side of the document toward the image sensor of the contact type, so as to compensate a disadvantage of the image sensor of the contact type having a small focal depth (see for example, Japanese Unexamined Patent Publication No. 2002-182437).

Examples of an image reading system of a document reader installed in a copying machine or the like generally include a document fixing system and a document moving system.

In the document fixing system, a document is placed on a transparent platen by a user and, then, out of image reading means including a light source, a mirror group, a lens and a CCD disposed under the platen (hereinafter referred to as "image reading means of an optical reduction system"), an image formed on the document is scanned while the light source and the mirror group are moved with respect to the document, so that a light beam reflected on a mirror is focused on the CCD via the lens, whereby the image formed on the document is electronified.

On the other hand, in the document moving system, the document is scanned in a state in which the light source and the mirror group are stationary with respect to the document conveyed by an automatic document feeder (hereinafter abbreviated as an "ADF") to then pass on the platen; thus, the image is read.

Most of the recent document readers have been provided with the ADF, and further, have been configured in such a manner as to read images formed on both sides of the document to be conveyed by the ADF.

A system for reading images formed on both sides of a document has been exemplified by a system in which an image formed on a first side of the document is read by image reading means of an optical reduction system disposed under a platen while the document passes on the platen and, then, the document is reversed by the use of a switch-back path disposed on the way of a document conveyance path, and an image formed on a second side of the document is read while the document passes on the platen again.

However, in the above-described system in which the document is reversed by the use of the switch-back path, the image formed on the first side is read, the document is reversed by the use of the switch-back path, and the image formed on the second side is read while the document passes on the platen again. Therefore, much time has been required for reading the images formed on both sides.

In addition, the use of the switch-back path complicates a document conveyance control and, further, causes the high possibility of a document jam. The document jam, in particular, has been a problem to be most avoided in the document reader provided with the ADF.

In view of the above-described situations, there has been devised a system in which second image reading means is provided for reading an image formed on a second side of a document on a document conveyance path after an image formed on a first side of the document is read until the document reaches a paper discharge tray such that the images formed on both sides can be read while the document passes on a platen only once, as disclosed in Japanese Unexamined Patent Publication No. 2002-182437.

However, the second image reading means has been disposed on the way of the document conveyance path in the ADF repeatedly opened or closed at frequent intervals with respect to the platen; therefore, there has been a restriction from the viewpoint of an installation space or durability against vibration. As a consequence, there has been usually adopted an image sensor of a contact type superior to the image reading means of the optical reduction system from the viewpoint of the installation space or the durability against the vibration.

In deed, the image sensor of the contact type is superior to the image reading means of the optical reduction system from the viewpoint of the installation space or the durability against the vibration, but is inferior to the image reading means of the optical reduction system from the viewpoint of a resolution or a focal depth.

Consequently, the image formed on the first side read by the image reading means of the optical reduction system is clear; however, the image formed on the second side read by the image sensor of the contact type is liable to become more unclear than the read image formed on the first side.

In view of this, most of the document readers have subjected data on the read images on the first and second sides to image processing, to then output the images, so as to achieve substantially the same quality of the image formed on the first side and the image formed on the second side.

However, such image processing imposes a heavy burden on a controller in the document reader and, hinders in shortening a time after image reading till image outputting.

In order to solve the above-described problems, it has been devised that image reading means of the optical reduction system for reading the image formed on the second side of the document, having performance similar to that of the image reading means of the optical reduction system for use in reading the image formed on the first side is replaced with the image sensor of the contact type.

As described above, the image reading means for reading the image formed on the second side is disposed on the way of the document conveyance path in the ADF repeatedly opened or closed with respect to the platen to generate vibration every time. Therefore, if the image reading means of the optical reduction system is disposed on the way of the document conveyance path in the ADF, there is induced a fear that an optical axis cannot be constantly kept caused by the deviation of an inclination angle of a mirror due to the repeated vibrations. It is indispensable to conduct a periodic maintenance in order to constantly keep the optical axis.

However, if the image reading means of the optical reduction system is merely disposed on the way of the document conveyance path in the ADF, there may occur an inconvenience that the maintenance of the image reading means of the optical reduction system cannot be conducted unless the ADF is disassembled every maintenance.

This not only requires much labor and skill for a maintenance service person but also forces a user to suffer an inconvenience of a long waiting time after the start of the maintenance till its completion.

SUMMARY OF THE INVENTION

The present invention has been accomplished in view of the above-described circumstances in the conventional art. Therefore, an object of the present invention is to provide a document reader capable of clearly reading images formed on first and second sides, which requires a short period of time from image reading to image outputting and in which maintenance is readily conducted.

The present invention provides a document reader comprising: document feeding means for conveying a document along a document conveyance path; first image reading means for reading an image formed on a first side of the conveyed document; and second image reading means for reading an image formed on a second side of the conveyed document, wherein each of the first and second image reading means is of an optical reduction system constituted of a light source, a mirror, a lens and an image sensor, and the second image reading means is unified into a single assembly including at least the mirror, the lens and the image sensor, to be thus detachably attached, as a single unit, to the document feeding means.

According to the present invention, each of the first and second image reading means is of the optical reduction system constituted of the light source, the mirror, the lens and the image sensor, and therefore, the read images on the first and second sides become clear with an excellent resolution. In addition, image processing for achieving the same image quality of the data on the images on the first and second sides can be simplified or omitted, so that a burden on a controller can be relieved, and further, a time from image reading to image outputting can be shortened.

Moreover, the second image reading means is unified into the assembly, to be thus detachably attached to the document feeding means as the single unit. Therefore, when the maintenance is conducted, the second image reading means is detached from the document feeding means, and then, the maintenance can be conducted, thereby saving the energy for the maintenance and shortening the maintenance time.

Additionally, in the case where there occurs deficiency which cannot be coped with by the maintenance at a site, the unit as a whole is replaced with another unit, so that the document reader can be recovered to a usable state at once.

BRIEF DESCRIPTION OF THE DRAWINGS

FIG. 2 is opened so as to allow a part of a document conveyance path to be exposed.

DESCRIPTION OF THE PREFERRED EMBODIMENTS

Figure 1:
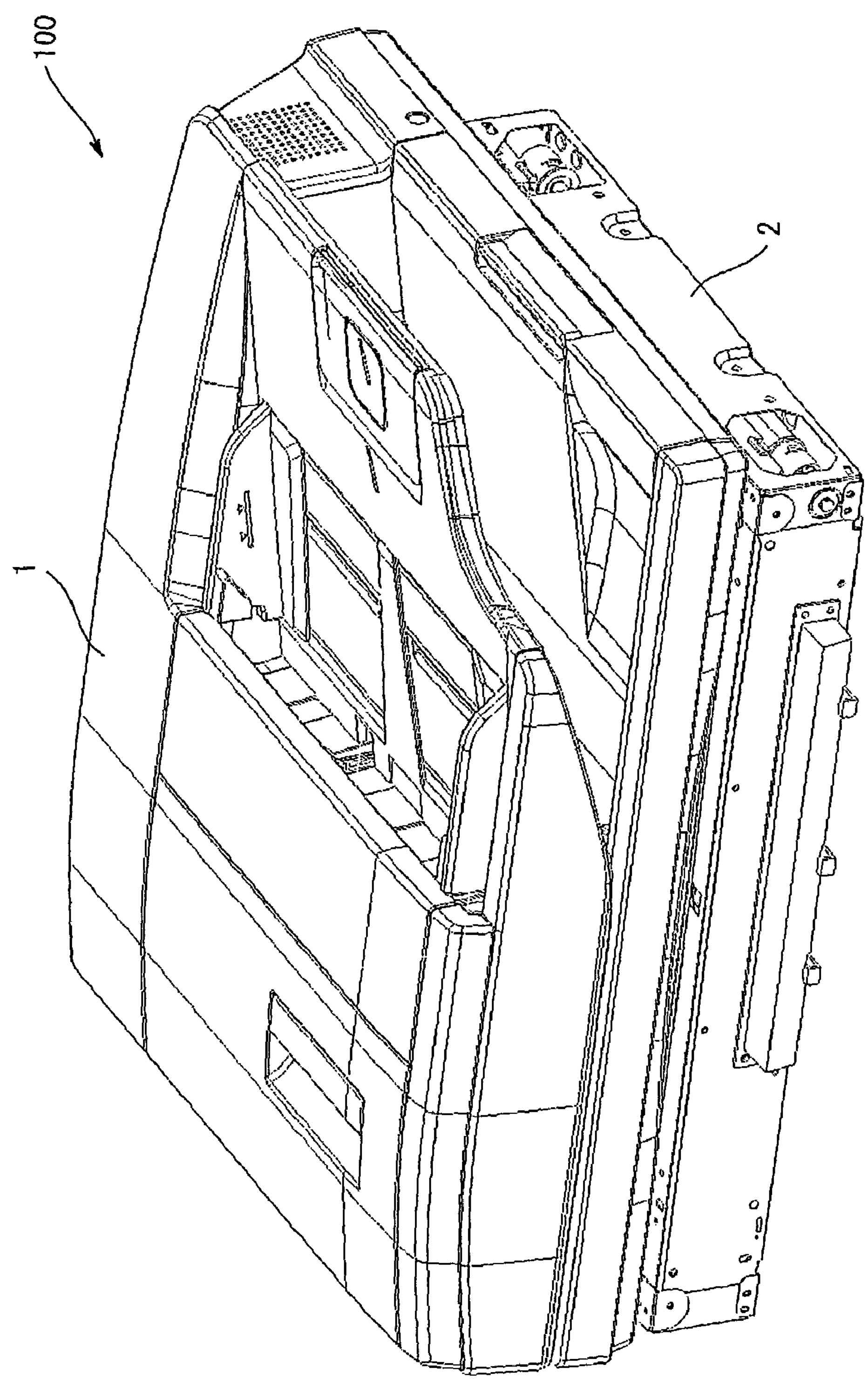
FIG. 1 is a perspective view showing the entire appearance of a document reader according to a preferred embodiment of the present invention.

A document reader according to the present invention comprises: document feeding means for conveying a document along a document conveyance path; first image reading means for reading an image formed on a first side of the conveyed document; and second image reading means for reading an image formed on a second side of the conveyed document, wherein each of the first and second image reading means is of an optical reduction system constituted of a light source, a mirror, a lens and an image sensor, and the second image reading means is unified into a single assembly including at least the mirror, the lens and the image sensor, to be thus detachably attached, as a single unit, to the document feeding means.

The configuration of the document feeding means in the document reader according to the present invention is not particularly limited as long as the document feeding means can convey the document along the document conveyance path. A specific example is a known automatic document feeder (abbreviated as an "ADF").

In addition, the unit signifies the single assembly including at least the mirror, the lens and the image sensor, which can be detachably attached, as one component, to the document feeding means. As a matter of course, the light source may be included in the said single assembly together with the mirror, the lens and the image sensor.

In the document reader according to the present invention, the document feeding means may include a frame for fixing the second image reading means, each of the frame and the second image reading means may have a pair of a projection and a recess for use in temporarily determining the positional relationship between the frame and the second image reading means when the second image reading means is disposed with respect to the frame, and the frame may have a fixing member for finally determining the positional relationship between the frame and the second image reading means so as to fix them.

With the above-described configuration, when the unified second image reading means is disposed in the frame of the document feeding means, the positional relationship between the second image reading means and the frame is inevitably determined by the set of the projection and the recess, so that the second image reading means can be readily disposed in the frame, and further, the second image reading means can be readily fixed to the frame with a highly positional accuracy.

Additionally, with the above-described configuration in which a pair of the projection and the recess is formed at each of the frame and the second image reading means and the frame has the fixing member, each of the fixing member and the second image reading means may have a pair of a projection and a recess for use in determining the positional relationship between the fixing member and the second image reading means.

With the above-described configuration, when the second image reading means temporarily positioned with respect to the frame in the document feeding means is finally fixed by the fixing member, the positional relationship between the fixing member and the second image reading means is inevitably determined, so that the fixing member can be readily fixed, and further, the second image reading means can be fixed to the frame with a more highly positional accuracy.

In the document reader according to the present invention, the second image reading means may have a light source holder for holding the light source therein, and the light source holder may form a part of the document conveyance path.

With the above-described configuration, the second image reading means serves as a part of the document conveyance path, thus reducing the size of the document reader.

In the document reader according to the present invention, the document feeding means may have an openable cover member for allowing a part of the document conveyance path to be exposed, the document conveyance path may have a through hole formed at a part in a region exposed when the cover member is opened, and an inclination angle of the mirror in the second image reading means can be adjusted via the through hole formed on the document conveyance path.

With the above-described configuration, it is much preferable from the viewpoint of the easiness of the maintenance and the shortage of the time that the inclination angle of the mirror, which most needs the maintenance, can be adjusted in the second image reading means in the state in which the second image reading means is kept to be fixed to the document feeding means.

Otherwise, also in the case where the maintenance is conducted after the second image reading means is detached from the document feeding means, the inclination angle of the mirror is adjusted so as to correct the deviation of the optical axis in the detachment state. Thereafter, the deviation of the optical axis can be completely corrected by finely adjusting the inclination angle of the mirror in the state in which the second image reading means is actually fixed to the document feeding means.

In other words, even if the deviation of the optical axis is corrected per unit such that the maintenance such as the adjustment of the inclination angle of the mirror is conducted in the state in which the unified second image reading means is detached from the document feeding means, the optical axis may further require a fine correction due to the positional relationship with respect to the document conveyance path in the state in which the second image reading means is actually fixed to the document feeding means. In view of this, it is much preferable that the inclination angle of the mirror can be adjusted in the state in which the second image reading means is fixed to the document feeding means.

Incidentally, the through hole formed at the document conveyance path should be preferably capped with some plug member during a normal operation.

In the document reader according to the present invention, it is preferable that the image sensor should consist of a CCD, and that the resolutions of the CCDs in the first and second image reading means should be equal to each other.

With the above-described configuration, the quality of the image formed on the first side, which is read by the first image reading means, becomes identical to the quality of the image formed on the second side, which is read by the second image reading means, thereby dispensing with any image processing for matching both of the image qualities with each other. Thus, it is possible to further shorten the time from the image reading to the image outputting.

In the document reader according to the present invention, in case where the second image reading means is detached from the document reader as the single unit, an inclination angle of the mirror in the second image reading means may be adjusted.

Hereinafter, the present invention will be described in detail by way of a preferred embodiment shown in the attached drawings.

Description will be made on a document reader according to the preferred embodiment of the present invention with reference to FIGS. 1 to 8.

FIG. 1 shows the entire appearance of a document reader 100 according to the preferred embodiment. In addition, FIG. 2 is a cross-sectional view schematically showing the document reader 100 shown in FIG. 1.

Figure 2:
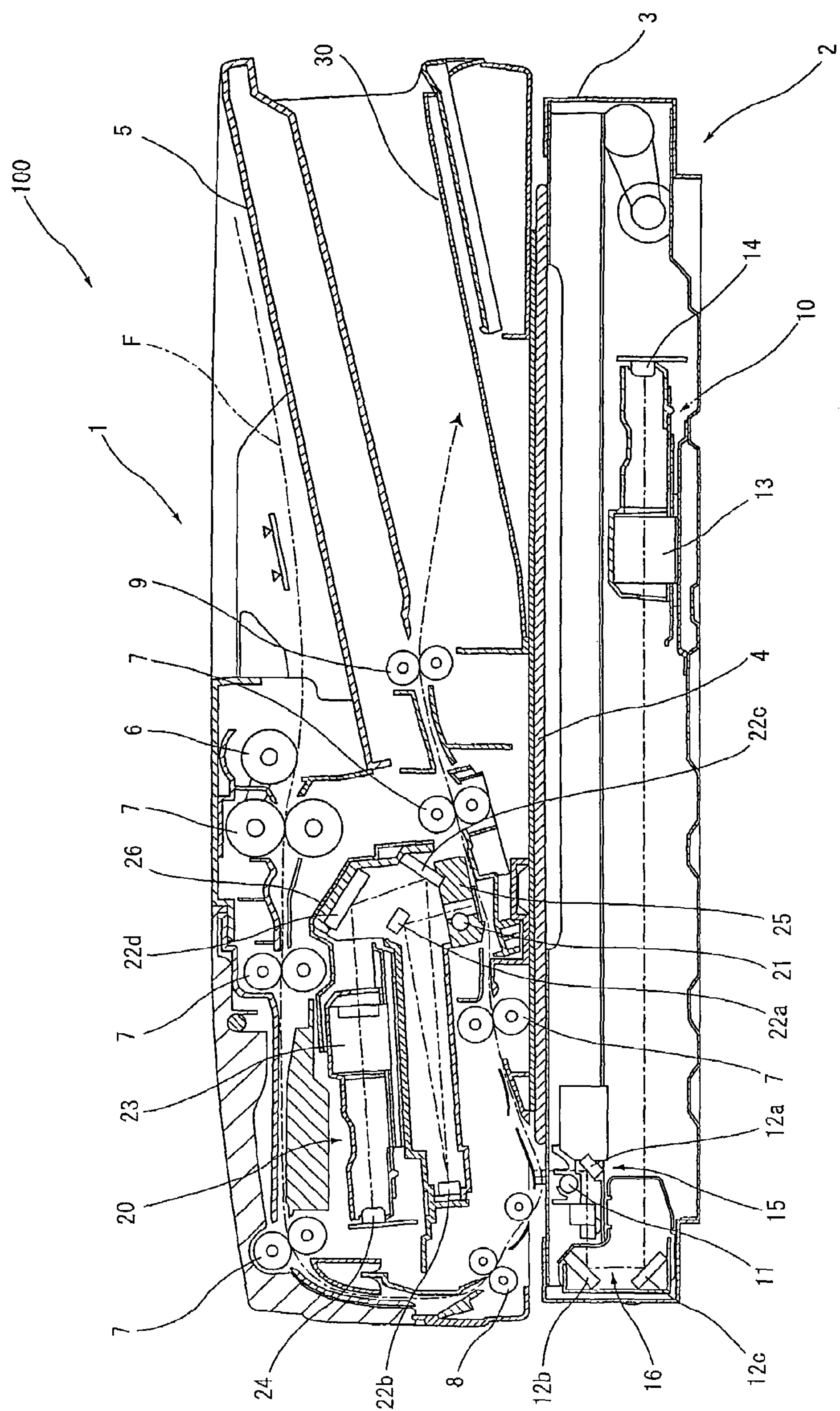
FIG. 2 is a cross-sectional view schematically showing the document reader shown in FIG. 1.

As shown in FIG. 2, the document reader 100 according to the preferred embodiment generally comprises: an automatic document feeder (abbreviated as an "ADF") 1 for automatically conveying a document along a document conveyance path F; a first image reader 10 for reading an image formed on an obverse (i.e., a first side) of the conveyed document; and a second image reader 20 for reading an image formed on a reverse (i.e., a second side) of the conveyed document. The first and second image readers 10 and 20 are of an optical reduction system, which include light sources 11 and 21, mirrors 12*a*, 12*b* and 12*c* and 22*a*, 22*b*, 22*c* and 22*d*, lenses 13 and 14 and CCDs (i.e., image sensors) 15 and 25, respectively. The second image reader 20 is unified into a single assembly including the light source 21, the first to fourth mirrors 22*a*, 22*b*, 22*c* and 22*d*, the lens 23 and the CCD 25, to be thus detachably attached to the ADF 1.

The document reader 100 shown in FIG. 1 is mounted on a copying machine (not shown) and includes mainly the ADF 1 containing the second image reader 20 therein and a main scanner 2 containing the first image reader 10 therein.

The ADF 1 and the main scanner 2 are joined to each other via a hinge (not shown). The ADF 1 can be freely opened or closed with respect to the main scanner 2 when the hinge is turned.

Figure 3:
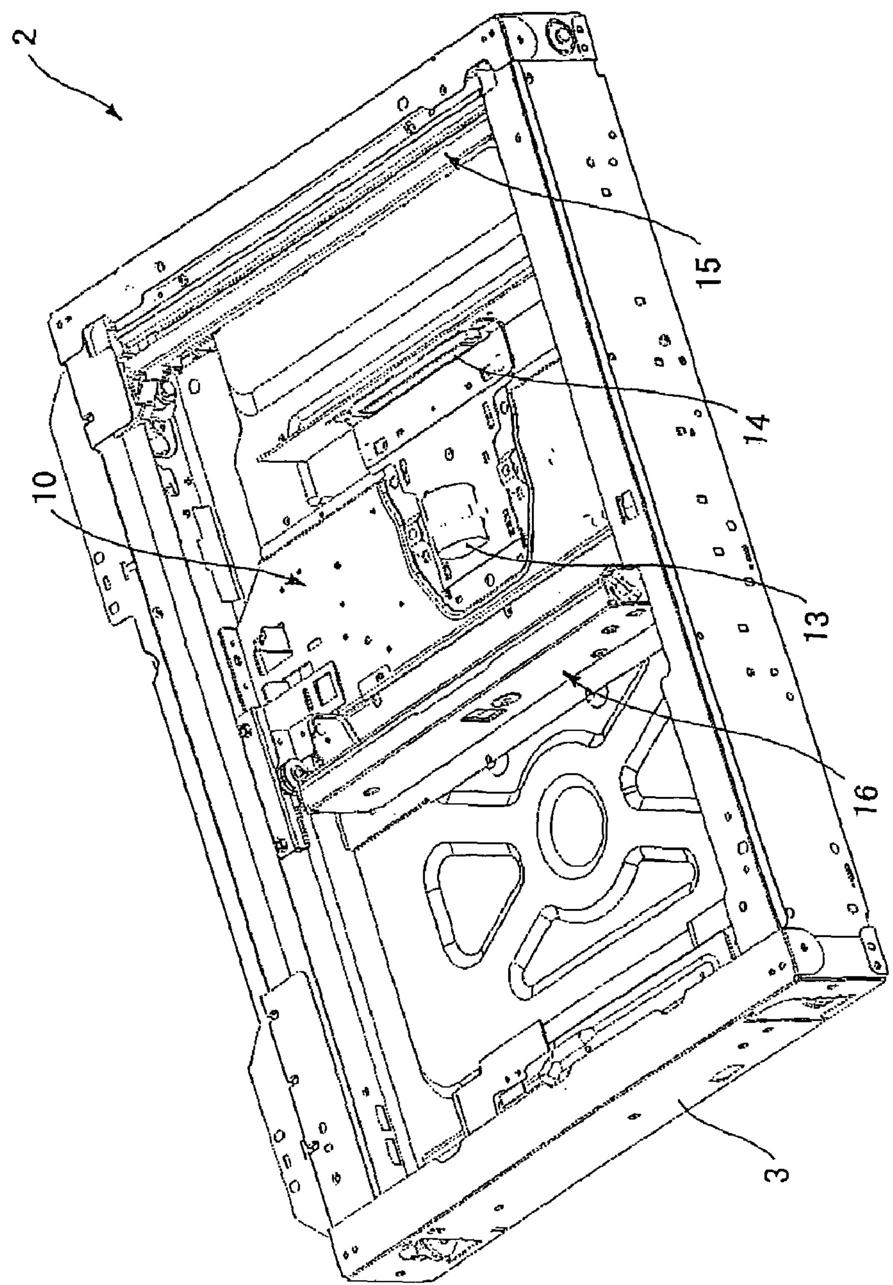
FIG. 3 is a perspective view showing a single main scanner disposed in the document reader shown FIG. 2.

FIG. 3 is a perspective view showing the single main scanner 2.

As shown in FIGS. 2 and 3, the main scanner 2 includes mainly a casing 3, a platen table 4 made of a transparent glass plate, and the first image reader 10 contained inside of the casing 3. Here, FIG. 3 shows the main scanner 2, in which the platen table 4 is detached and, further, a cover for shielding the lens 13 and the CCD 14 from outside light is detached.

The first image reader 10 includes mainly a light source unit 15 holding the light source 11 and the first mirror 12*a* therein, a mirror unit 16 holding the second mirror 12*b* and the third mirror 12*c* therein, the lens 13 and the CCD 14.

The main scanner 2 can cope with a document fixing system in which a document is placed on the platen 4 by a user and an image of the document is read, and a document moving system in which an image of a document is read while the document is automatically conveyed by the ADF 1.

In the case where the image of the document is read by the document fixing system, the light source unit 15 and the mirror unit 16 are moved to home positions, respectively, according to the document fixing system. Thereafter, the light source unit 15 is moved at a constant speed in a sub scanning direction to scan the image of the document while irradiating the document with a light beam. At the same time, the mirror unit 16 is moved at a movement speed half the movement speed of the light source unit 15 also in the sub scanning direction.

The light beam irradiated by the light source unit 15 to be then reflected on the document is reflected on the first mirror 12*a* disposed in the light source unit 15, its optical path is converted at an angle of 180° by the second and third mirrors 12*b* and 12*c* in the mirror unit 16, and the light beam reflected on the third mirror 12*c* is focused on the CCD 14 through the lens 13, to be thus converted into electronic image data.

Incidentally, the positions of the light source unit 15 and the mirror unit 16 are different in FIGS. 2 and 3. FIG. 2 shows a state in which the light source unit 15 and the mirror unit 16 are located at the home positions, respectively. In contrast, FIG. 3 shows a state in which the light source unit 15 and the mirror unit 16 are moved to maximum in the sub scanning direction.

On the other hand, in the case where the image of the document is read by the document moving system, the light source unit 15 and the mirror unit 16 stay at the home positions, respectively, shown in FIG. 2. In this state, the light source 11 irradiates, with a light beam, the document conveyed over the home positions by the ADF 1, thereby scanning the image. The light beam reflected on the obverse of the document is reflected on the first mirror 12*a*, its optical path is converted at an angle of 180° by the second and third mirrors 12*b* and 12*c* in the mirror unit 16, and the light beam is focused on the CCD 14 through the lens 13, to be thus converted into electronic image data, like in the above-described document fixing system.

As shown in FIG. 2, the ADF 1 includes mainly a taking-in roller 6 for taking the documents stacked on a document mount 5 one by one into the ADF 1, a plurality of pairs of feed rollers 7 for conveying the taken-in documents along the document conveyance path F, a pair of regist rollers 8 for adjusting a paper conveying timing, and a pair of paper discharge rollers 9 for discharging the document whose image is read to a paper discharge tray. The ADF 1 is disposed such that the unified second image reader 20 is housed inside of the document conveyance path F curved in a substantial U shape.

The second image reader 20 includes mainly a light source holder 25 for holding the light source 21 therein, the first mirror 22*a*, the second mirror 22*b*, the third mirror 22*c*, the fourth mirror 22*d*, the lens 23 and the CCD 24. These members are housed inside of an unit casing 26, to be thus unified into a single assembly, which is detachably attached to the ADF 1. Further, these members are configured to achieve the optical reduction system to be read the image in accordance with the conventional way as known in the art. Incidentally, in the second image reader 20, the light source 21, the lens 23 and the CCD 24 held in the light source unit 25 are the same as the components constituting the first image reader 10.

As described above, the second image reader 20 reads an image formed on the reverse of the document conveyed on the document conveyance path F when a user requires that images formed on both sides of the document should be read.

Specifically, after an image formed on the obverse of the document is read by the first image reader 10, the document passes under the light source holder 25 in the second image reader while the document is conveyed toward a paper discharge tray 30 along the document conveyance path F.

During this time of period, the light source 21 in the second image reader 20 irradiates the reverse of the document with the light beam. The optical path of the light beam reflected on the reverse of the document is sequentially converted by the first to fourth mirrors 22*a*, 22*b*, 22*c* and 22*d*, and then, the light beam is focused on the CCD 24 through the lens 23, to be thus converted into electronic image data.

Like the first image reader 10, the second image reader 20 is of an optical reduction system excellent in resolution and focal depth. Therefore, it is important that the light beam reflected on the document should be precisely focused on the CCD 24 with a predetermined optical axis in order to satisfactorily exhibit the performance of the second image reader 20.

Furthermore, the first to fourth mirrors 22*a*, 22*b*, 22*c* and 22*d* need be accurately inclined at predetermined angles, respectively, in order to maintain the predetermined optical axis.

However, as described above, the ADF 1 can be freely opened or closed with respect to the main scanner 2. Every time the ADF 1 is repeatedly opened or closed by the user, the vibration is transmitted to the second image reader 20, thereby inducing a fear of gradual deviation of the inclination of the first to fourth mirrors 22*a*, 22*b*, 22*c* and 22*d* from the predetermined angles.

As a consequence, the optical axes are preferably adjusted such that the inclination angles of the first to fourth mirrors 22*a*, 22*b*, 22*c* and 22*d* are adjusted by a periodic maintenance, to thus allow the light beam reflected on the document to be precisely focused on the CCD 24 in order to satisfactorily exhibit the performance of the second image reader 20.

Figure 4:
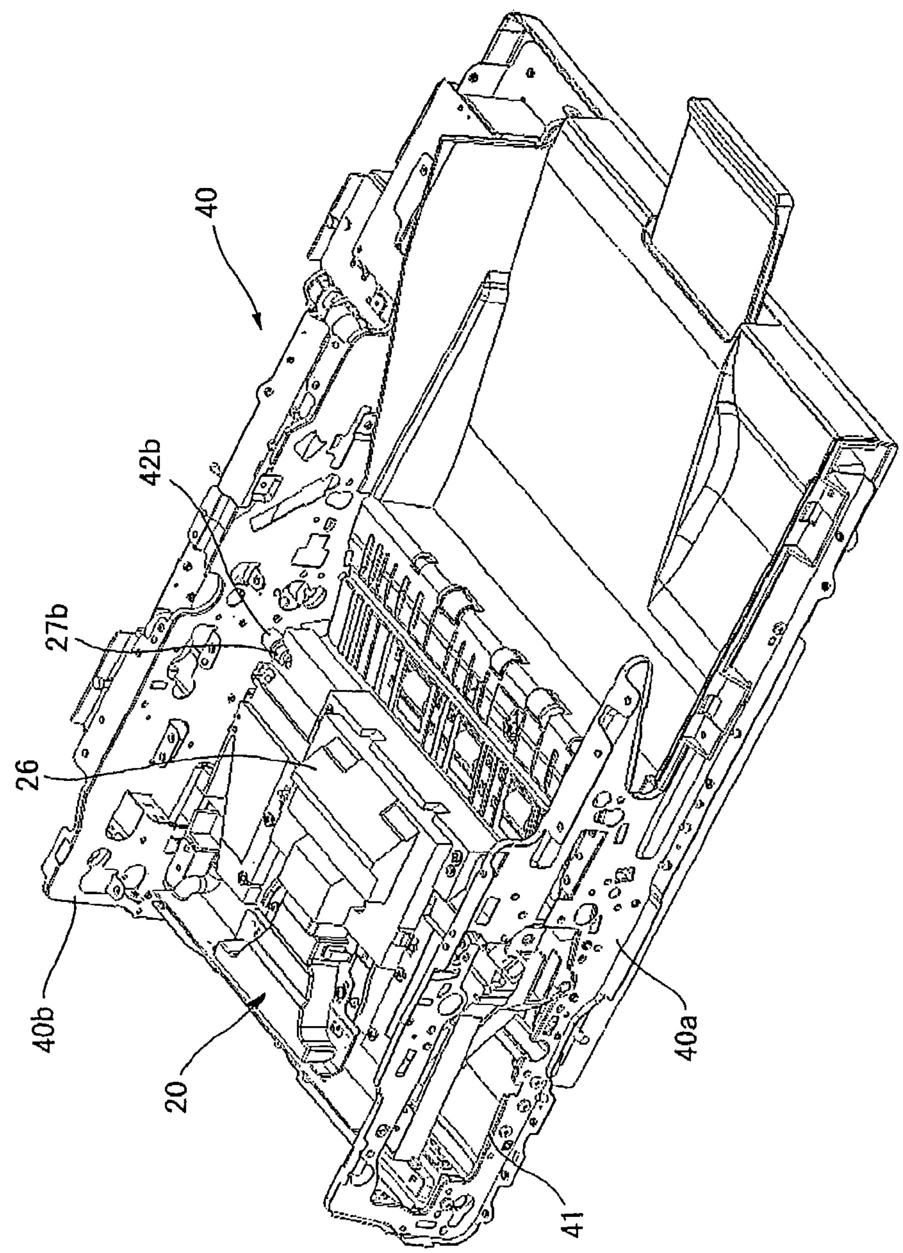
FIG. 4 is a perspective view showing a state in which a unified second image reader is disposed in a frame of an ADF attached to the document reader shown FIG. 2.

In view of this, the second image reader 20 in the preferred embodiment is unified for the purpose of labor savings in maintenance and the shortage of the time, and further, it is detachably attached to a frame 40 of the ADF 1 (see FIG. 4).

Figure 5:
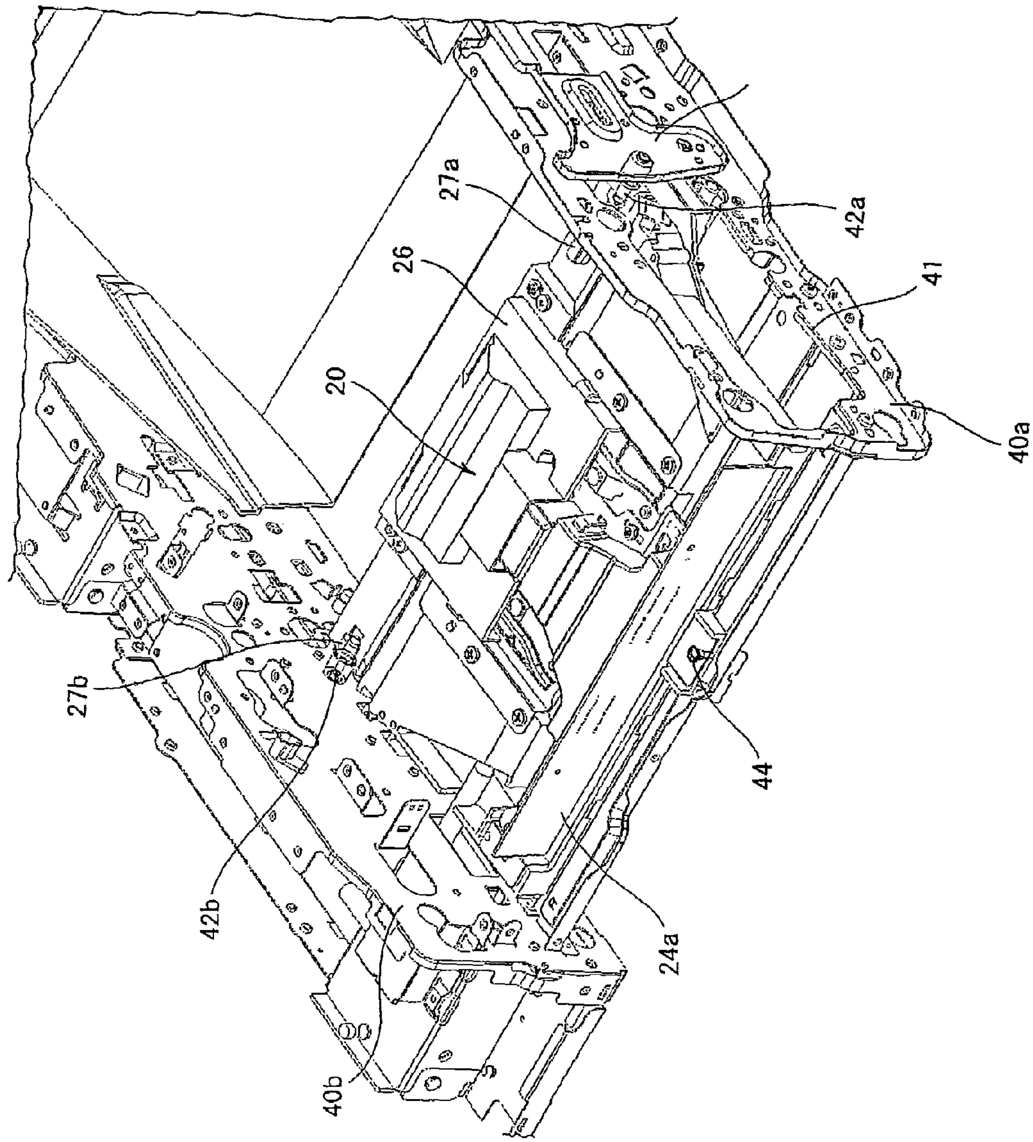
FIG. 5 is an enlarged view showing essential parts of FIG. 4.

FIGS. 4 and 5 are perspective views showing a state in which the unified second image reader 20 is exposed by omitting a faced plate and a part of the document conveyance path.

As shown in FIG. 4, the unified second image reader 20 is inserted through an opening 41 formed at a front frame 40*a* in the ADF 1 having a shape in conformity with a laterally cross-sectional shape of the unit casing 26, to be thus disposed in the frame 40 in the ADF 1.

At a rear frame 40*b* in the ADF 1 is formed a boss (i.e., a projection) 42*b* fitted to a receiving portion (i.e., a recess) 27*b* formed at the unit casing 26, thereby temporarily determining the positional relationship between the frame 40 and the second image reader 20.

Subsequently, as shown in FIG. 5, a boss 42*a* formed at a fixing plate (i.e., a fixing member) 43 is fitted into a receiving portion (i.e., a recess) 27*a* formed at the unit casing 26 by screwing the fixing plate 43 to the front frame 40*a*, thereby finally determining the positional relationship between the second image reader 20 and the frame 40.

Here, the boss 42*b* formed at the rear frame 40*b* and the boss 42*a* formed at the fixing plate 43 are designed to be positioned in the vicinity of a reading line of the second image reader 20, that is, a line, on which the document is scanned with the light beam irradiated from the light source 21. This is because the fixing positional accuracy of the second image reader 20 to the frame 40 is enhanced as much as possible.

Thereafter, the second image reader 20 is screwed via a screw 44 on a reverse side of a CCD base plate 24*a* and at a position substantially at the center in a unit inserting direction, thereby completing the attachment of the second image reader 20 to the frame 40. Incidentally, the second image reader 20 is finally screwed on the reverse side of the CCD base plate 24*a* since the thermal expansion of the unified second image reader 20 is suppressed as much as possible from adversely influencing on the reading accuracy by finally fixing the second image reader 20 at a position as remote as possible from the reading line.

Figure 6:
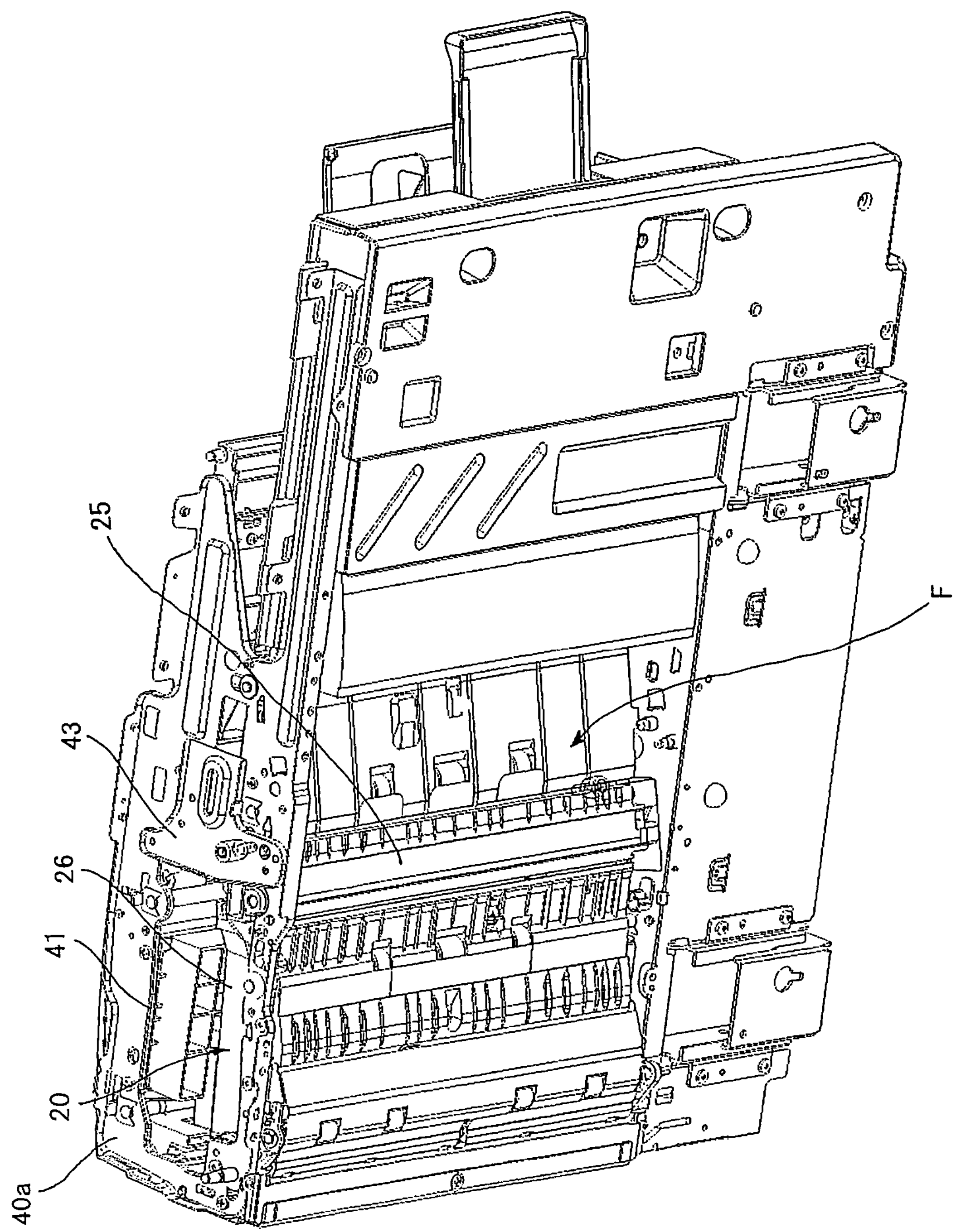
FIG. 6 is a perspective view showing a state in which the frame of the ADF shown FIG. 4 having the second image reader disposed therein is viewed from under.

FIG. 6 is a perspective view showing the frame 40 having the second image reader 20 attached thereto, as viewed from the reverse.

As shown in FIGS. 2 and 6, the light source holder 25 in the second image reader 20 forms a part of the document conveyance path F. In other words, the lower surface of the light source holder 25 serves as the document conveyance path F.

Consequently, it is possible to remarkably suppress an increase in size of the ADF 1 in a height direction caused by using the image reader of the optical reduction system as an image reader for reading the image formed on the reverse.

When the second image reader 20 is detached from the ADF 1, the faced plate is first detached from the ADF 1 shown in FIG. 1, so that the front frame is exposed, as shown in FIGS. 4 to 6. Here, although a part of the document conveyance path F is omitted to expose the unified second image reader 20 in FIGS. 4 to 6, the document conveyance path F need not be detached when the maintenance is conducted in actual as long as the front frame 40*a* is exposed.

Thereafter, the screw 44 on the reverse of the CCD base plate 24*a* is detached, and further, the fixing plate 43 is detached from the front frame 40*a*. In addition, the unit casing 26 is withdrawn through the opening 41 formed at the front frame 40*a*, so that the second image reader 20 can be detached as the single unit.

After the optical axis of the single unit is adjusted by the adjustment of the inclination angles of the first to fourth mirrors or the like, the detached second image reader 20 is attached again to the frame 40 in the ADF 1 in the same manner as described above.

In this stage, the optical axis of the second image reader 20 is adjusted at substantially the predetermined angle. Furthermore, it is preferable that the inclination angle of the mirror should be finely adjusted in the state in which the second image reader 20 is attached to the ADF 1 in consideration of slight deformation or distortion of the unit casing 26 caused by the fixing work or the positional accuracy with respect to the document conveyance path F.

Figure 7:
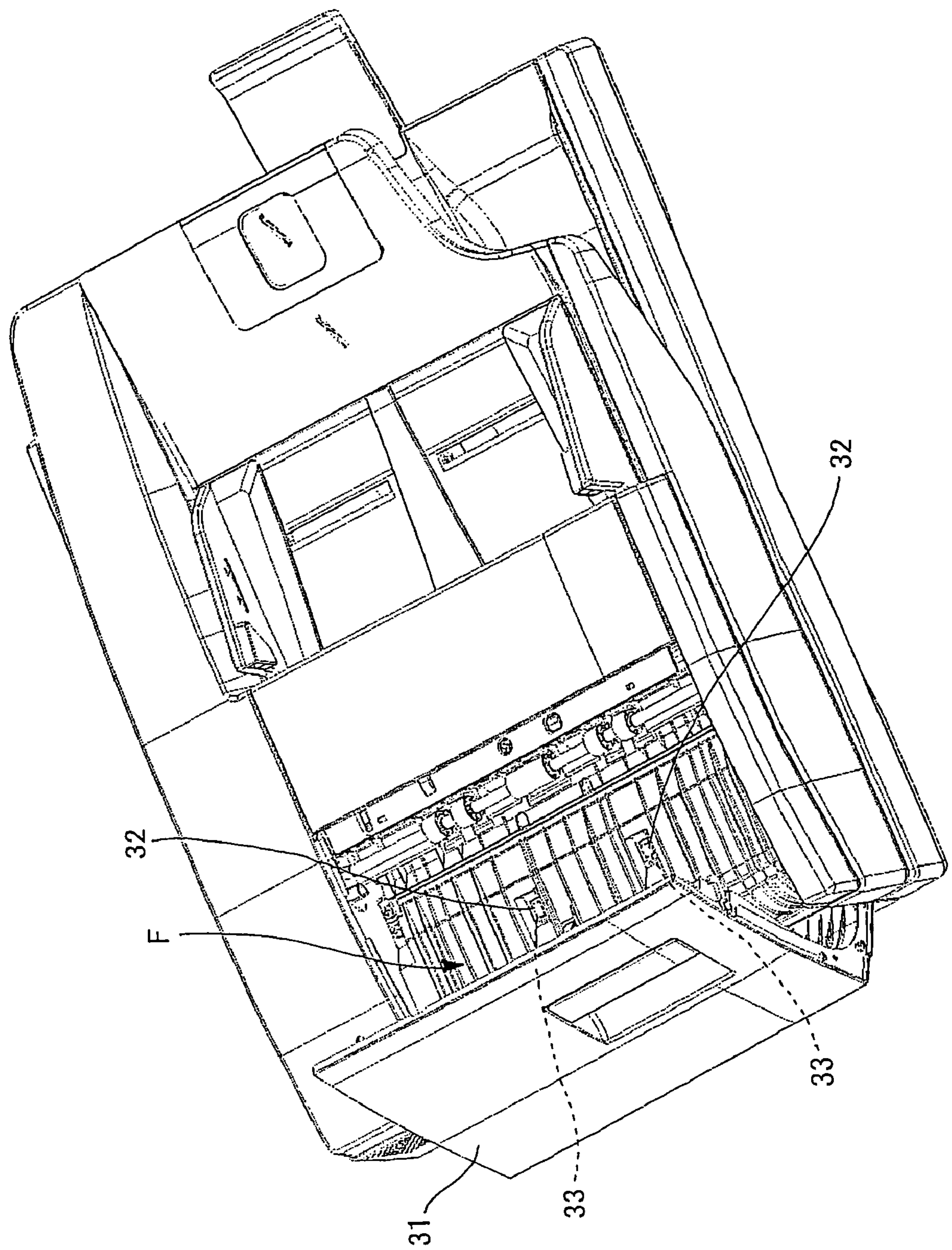
FIG. 7 is a perspective view showing a state in which a cover member in the ADF shown
Figure 8:
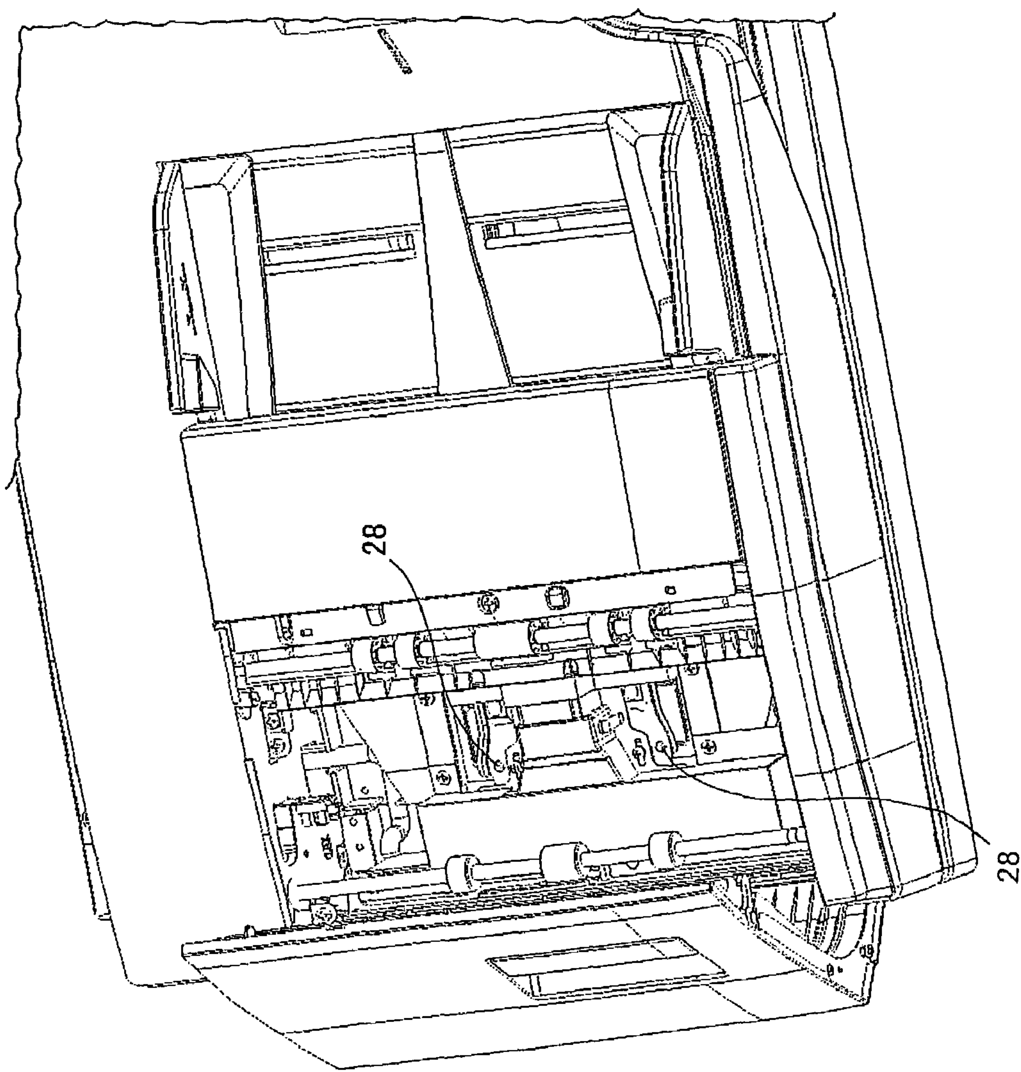
FIG. 8 is a perspective view showing a state in which the document conveyance path is detached from the ADF in the state shown in FIG. 7.

As shown in FIG. 7, the ADF 1 includes an openable cover member 31 allowing a part of the document conveyance path F to be exposed in order to cope with a document jam. When the cover member 31 is opened, a part of the document conveyance path F is exposed.

The document conveyance path F is formed a through hole 33 which is capped with a plug member 32 during a normal operation. An adjustment screw 28 (see FIG. 8) for adjusting the inclination angle of the mirror can be turned by inserting a screwdriver into the through hole 33. Here, although the document conveyance path F is omitted in FIG. 8, the document conveyance path F need not be detached at the time of the actual adjustment. The inclination angle of the mirror can be adjusted in the state in which the document conveyance path F is kept to be disposed.

What is claimed is:

1. A document reader comprising:

document feeding means for conveying a document along a document conveyance path;

first image reading means for reading an image formed on a first side of the conveyed document;

second image reading means for reading an image formed on a second side of the conveyed document, wherein each of the first and second image reading means is of an optical reduction system constituted of a light source, a mirror, a lens and an image sensor, and the second image reading means is disposed within the document feeding means and is unified into a single assembly including at least the mirror, the lens and the image sensor, to be thus selectively attached or detached, as a single unit, to the document feeding means.

2. The document reader according to claim 1, wherein the document feeding means includes a frame for fixing the second image reading means, each of the frame and the second image reading means has a pair of a projection and a recess for use in temporarily determining the positional relationship between the frame and the second image reading means when the second image reading means is disposed with respect to the frame, and the frame has a fixing member for finally determining the positional relationship between the frame and the second image reading means so as to fix them.

3. The document reader according to claim 2, wherein each of the fixing member and the second image reading means has a pair of a projection and a recess for use in determining the positional relationship between the fixing member and the second image reading means.

4. The document reader according to claim 1, wherein the second image reading means has a light source holder for holding the light source therein, and the light source holder forms a part of the document conveyance path.

5. The document reader according to claim 1, wherein the document feeding means has an openable cover member for allowing a part of the document conveyance path to be exposed, the document conveyance path has a through hole formed at a part in a region exposed when the cover member is opened, and an inclination angle of the mirror in the second image reading means can be adjusted via the through hole formed on the document conveyance path.

6. The document reader according to claim 1, wherein the image sensor consists of a CCD, and the resolutions of the CCDs in the first and second image reading means are equal to each other.

7. The document reader according to claim 1, wherein in case where the second image reading means is detached from the document reader as the single unit, an inclination angle of the mirror in the second image reading means can be adjusted.

* * * * *